Patented Jan. 27, 1948

2,435,071

UNITED STATES PATENT OFFICE 2,435,071

AMIDES OF CYCLIC SULFONES

Theodore W. Evans, Oakland, Rupert C. Morris, Berkeley, and Edward C. Shokal, Oakland, Calif., assignors to Shell Development Company, San Francisco, Calif., a corporation of Delaware No Drawing. Application July 19, 1943, Serial No. 495,377

7 Claims. (Cl. 260—329)

This invention relates to a novel and useful class of compounds, and particularly pertains to the reaction products formed by the interaction of a carboxylic acid, or of the corresponding anhydride, with amino derivatives of cyclic sulfones. Specifically, the invention is directed to substituted and unsubstituted sulfolanylamines and sulfolenylamines in which at least one of the hydrogen atoms of the amino radical is substituted by an acyl radical.

The terms "sulfolanylamine" and "sulfolenylamine" refer to the amino derivatives of sulfolanes and sulfolenes, respectively, i. e., compounds in which at least one amino radical is directly attached to one of the nuclear carbon atoms of a sulfolane or sulfolene. The term "sulfolane" refers to a saturated cyclic structure containing four carbon atoms and a sulfur atom in the ring, the sulfur atom of this heterocyclic saturated five-membered ring having two oxygen atoms attached thereto. This compound is otherwise termed "thiacyclopentane - 1,1 - dioxide," "thiolane-1,1-dioxide," "cyclotetramethylene sulfone," or "dihydrobutadiene sulfone." Similarly, the term "sulfolene" refers to an unsaturated sulfolane, i. e., sulfolane containing a single olefin linkage between any two adjoining carbon atoms. This compound has also been called "thiacyclopentene-1,1-dioxide." The double bond may be between any two adjacent carbon atoms of the ring, the generic term "sulfolene" covering both the simple unsubstituted 2-sulfolene (which is 2-thiolene-1,1-dioxide or alpha-butadiene sulfone), and the unsubstituted 3-sulfolene (which is 3-thiolene-1,1-dioxide or beta-butadiene sulfone), as well as the substituted derivatives thereof, i. e., sulfolenes in which different organic and/or inorganic radicals are substituted for one or more of the hydrogen atoms of both simple unsubstituted sulfolenes. Similarly, the term "sulfolane" generically covers both the unsubstituted sulfolane having the general formula

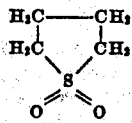

and the substituted derivatives of this compound.

It is an object of the present invention to provide a new class of chemical compounds which possess unexpectedly useful properties. Still other objects will be apparent from the description of the invention.

Broadly, the amides and imides of the present invention comprise the reaction products of a substituted or unsubstituted sulfolanylamine or sulfolenylamine with a carboxylic acid or its anhydride. More specifically stated, the novel amides consist of substituted or unsubstituted sulfolanylamines or sulfolenylamines in which at least one of the hydrogen atoms of the amino radical is substituted by a saturated or unsaturated acyl radical. A preferred subgroup of the novel compounds comprises the reaction products of a carboxylic acid or anhydride with sulfolanylamines in which the amino radical is attached to the ring carbon atom in the 3-position, the remaining free bonds of the nuclear carbon atoms of the sulfolane ring being taken up by hydrogen atoms, halogen atoms, hydroxyl radicals, and/or organic radicals, preferably hydrocarbon radicals. This preferred subgroup of amides may be represented by the following general structural formula:

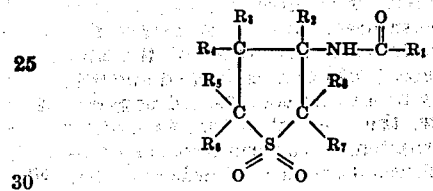

in which $R_1$ designates an organic radical which may be alkyl, alkenyl, cycloalkyl, cycloalkenyl, aryl, aralkyl, alkaryl, or a suitable substituted derivative thereof, e. g. halo-substituted derivative, while the radicals $R_2$ through $R_8$ are each a member of the group consisting of the hydrogen atom, a halogen atom, the hydroxyl radical, and an organic radical, preferably a hydrocarbon radical. Examples of such hydrocarbon radicals are methyl, ethyl, propyl, isopropyl, n-butyl, isobutyl, secondary butyl, tertiary butyl, normal pentyl, isopentyl, secondary pentyl, hexyl, octyl, decyl, dodecyl, tetradecyl, cetyl, stearyl, trimethyl octadecyl, allyl, methallyl, crotyl, ethyl vinyl carbinyl, butenyl, pentenyl, hexenyl, propargyl, allyl, phenyl naphthyl, tolyl, xylyl, benzyl, phenethyl, methallyl phenyl, naphthyl allyl, phenyl vinyl carbinyl, cyclopentyl, cyclohexyl, ethyl cyclohexyl, cyclopentenyl, cyclohexenyl, and vinyl cyclohexenyl. Also, the hydrogen atom of the imino (imido) radical may be substituted by an organic, and preferably a hydrocarbon, radical.

The amides and imides of the present invention may be prepared by reacting, preferably via a condensation reaction, a carboxylic acid or the corresponding anhydride with a cyclic sulfone containing an amino radical directly attached to one of the nuclear carbon atoms. As examples of the amino substituted cyclic sulfones which may thus be reacted with the carboxylic acids or their anhydrides, reference is made to 3-sulfolanylamine (3-amino cyclotetramethylene sulfone) and 3-sulfolenylamine (3-amino-4-sulfolene), as well as other various sulfolanylamines and sulfolenylamines which contain various substituents and particularly alkyl radicals attached to the various nuclear carbon atoms, e. g. 2-methyl-3-sulfolanylamine, 2,4-dimethyl - 4 - sulfolanylamine, and the like, and their homologues and analogues.

Any carboxylic acid, whether saturated or unsaturated, as well as any carboxylic acid anhydride, may be used as the reactant in the manufacture of the novel amides. Representative examples of the saturated carboxylic acids which may thus be employed are formic, acetic, propionic, butyric, valeric, caproic, caprylic, capric, lauric, myristic, palmitic, stearic, behenic, cerotic, and the like. The following are examples of the unsaturated carboxylic acids which may be employed as a reactant: acrylic, crotonic, isocrotonic, alpha-methyl acrylic, vinyl acetic, beta-ethyl acrylic, beta-vinyl acrylic, beta-beta-dimethyl acrylic, beta-pentenoic, allyl acetic, angelic, tiglic, hydrosorbic, sorbic, teracrylic, myristolenic, oleic, linoleic, linolenic, maleic, fumaric, citric, citraconic, mesaconic, itaconic, glutaconic, and the like. Also, substituted acids such as the halogenated fatty acids of the type of chloroformic, chloracetic, bromopropionic, chloracrylic, chlorocrotonic, and the like, are suitable in this reaction. Generically, the above group is intended to include all carboxylic acids containing one or more carboxyl groups, and in the case of unsaturated acids one or more unsaturated bonds between two carbon atoms, preferably of aliphatic character. A preferred group of acids comprises the saturated and unsaturated fatty acids. As stated, the anhydrides of the above acids, and preferably of the mentioned and other fatty acids, may be also used. As will be pointed out hereinbelow, the use of polybasic acid anhydrides generally tends to form the corresponding imides, whereas the use of the monobasic acids, unless the latter are employed in an excess, will produce the corresponding amide of the sulfolanylamine or of the sulfolenylamine.

The formation of the amides or imides in accordance with the present invention may be effected without resorting to the use of any catalysts, although in some cases various reaction promoters or catalysts may be employed, particularly when it is desired to accelerate the rate of formation of the desired amide or imide. The reaction may be effected in a wide variety of manners. For example, the reaction may be realized by a mere heating of the acid or anhydride in contact with the amino derivative of the cyclic sulfone, the reactants being preferably introduced into a suitable reaction vessel equipped with means for agitation, and heating the reactants. The reactants may be introduced into the reaction vessel independently or they may be mixed prior to their introduction thereinto. In a majority of cases, the formation of the amido or imido derivatives is effected by heating the reactants in contact with each other at or about the boiling temperature of the reaction mixture at atmospheric pressure and with or without refluxing. In some instances, the rate of reaction may be accelerated by resorting to the use of superatmospheric pressures and higher temperatures. In order to prevent undesirable side reactions, it is preferable to effect the reaction by operating in such a manner that the water formed as the result of the reaction is removed from the reaction zone substantially as soon as formed. This may be effected by employing addition agents which form low-boiling azeotropes. Benzene may be used as such addition agent, although all of the well known azeotrope-forming substances, e. g. aromatic hydrocarbons, may be used with equal facility. Manifestly, such addition agents must be inert substances and may or may not form low-boiling azeotropic mixtures with the desired reaction product, i. e. the amides or imides formed. In general, the amides are relatively high-boiling compounds and are recovered from the reaction vessel without resorting to distillation of these amides or imides. They may then be, if desired, purified in any well known manner to separately recover these novel compounds in a pure or substantially pure manner, this recovery and purification being effected by any suitable means such as stratification, extraction, salting out, use of drying agents, and the like, the particular recovery and purification system to be employed depending upon the physical and chemical properties of the particular compound to be treated.

The novel amides may be prepared by reacting a single substituted or unsubstituted sulfolanylamine or sulfolenylamine with a single saturated or unsaturated carboxylic acid or anhydride. Thus, the character of the novel amides may be controlled by varying the character of the reactants. On the other hand, mixed amides may be prepared by reacting a mixture of different sulfolanylamines or sulfolenylamines with a specific carboxylic acid or anhydride, or a specific amino derivative of a given cyclic sulfone may be reacted with a mixture of different species of acids or anhydrides.

Generally, it is possible to control the reaction so that only one of the hydrogen atoms attached on the amino radical is substituted by an acyl radical, thus producing a substituted amide. However, it is possible, for example, by employing a polybasic carboxylic acid anhydride to effect the reaction under such conditions that both of the hydrogen atoms are substituted by acyl radicals to produce a substituted imide. Also, it is possible to employ a dicarboxylic acid which may be saturated or unsaturated and effect the reaction so as to cause both carboxyl groups to react with the same molecule of the sulfolanylamine or sulfolenylamine.

The following examples are given for the purpose of illustrating certain specific embodiments of the present invention. It is to be understood however that these examples are not to be considered limiting.

Example I

Approximately 403 grams (2.98 mols) of 3-sulfolanylamine were introduced into a 2-liter kettle provided with a reflux condenser. The contents of the kettle were then heated to a temperature of about 100° C. and acetic anhydride was then slowly added until approximately 337 grams (3.30 mols) thereof were thus introduced into the kettle. During this addition, the temperature varied between about 60° C. and about 100° C. In a short time, a solid white crystalline material separated. This material was removed and re-crystallized from isopropyl alcohol. An analysis gave the following results:

| | | |
|---|---|---|
| Carbon | per cent | 40.19 |
| Hydrogen | do | 6.27 |
| Sulfur | do | 18.1 |
| Nitrogen | do | 7.66 |
| Melting Point | ° C | 150–152 |
| Yield | per cent | 78 |

The above and other results proved that the reaction product was N-(3-sulfolanyl) acetamide.

*Example II*

Approximately 70 grams (0.25 mol) of oleic acid, about 36 grams (0.25 mol) of 3-sulfolanylamine, and about 100 cc. of benzene were introduced into a still and heated with refluxing to separate the water formed as a byproduct of the reaction. Thereafter, the benzene was distilled off by heating to a temperature of about 200° C. The residual material was then introduced into a flask, and washed with diethyl ether to remove any unreacted oleic acid. The solid residue was then filtered off, washed with hot water to remove any unreacted sulfolanylamine, re-filtered, and finally dried by heating for about 2 hours at a temperature of about 100° C. and a pressure of between about 1 and 2 mm. of mercury. The final product, which was found by analysis to be N-(3-sulfolanyl) oleylamide, is a waxy material, substantially insoluble in kerosene, and having a melting point of about 87° C. to 88° C. It dissolves nitrocellulose and cellulose acetate. It is very stable and shows substantially no decomposition even upon heating to 275° C. at 1 mm. of mercury pressure.

*Example III*

About 282 grams (1 mol) of oleic acid, 144 grams (1 equivalent weight) of 95% pure 3-sulfolanylamine and 100 cc. of benzene were introduced into a one-liter flask connected to a separating head. The mixture was then heated with reflux for about 12 hours. The water formed as a by-product was removed from the system during this heating step. The remaining reaction product was washed with diethyl ether to remove any unreacted oleic acid, then with hot water to remove any unreacted sulfolanylamine, and then pumped to dryness for a period of about 36 hours at a temperature of about 100° C. The waxy product thus obtained had a melting point of between about 87° C. and 88° C., was stable even when heated to boiling (approximately 350° C.), and was found by analysis to be N-(3-sulfolanyl) oleylamide.

*Example IV*

Approximately 35.5 grams of 3-sulfolanylamine were added to about 36 grams of 2-ethyl hexoic acid. The mixture was vigorously agitated and heated on a water bath for a period of about 2 hours. The solid material formed as a result of this treatment was separated and purified. Its melting point was about 45° C. Upon analysis the product was found to be N-(3-sulfolanyl)-2-ethyl hexoylamide. It was also found that ethyl cellulose was soluble in this amide, while cellulose acetate and polyvinyl chloride were only slightly soluble therein.

The novel amides and imides find utility in a large variety of industries. For example, most of the amides, and particularly those having a long acyl radical attached to the nitrogen atom of the amino group, are waxy in character, and may be used as ingredients in the manufacture of varnishes, lacquers, floor polishes, furniture polishes, automobile polishes, and the like. Also, these novel compounds may be employed in paints as protective means, e. g. for the protection of various apparatuses from corrosive fumes, salt water, etc. At least some of the amides and imides are also highly suitable as plasticizers and tackifiers in natural and synthetic resins, e. g. cellulose acetate, polyvinyl chloride, ethyl cellulose, and the like. They are particularly suitable for plasticizing synthetic fibers prepared from poly-amides, such as the poly-amide prepared from adipic acid and hexamethylenediamine. Other amides are of value as addition compounds to insecticides, the amides having the property of enhancing the action of the usual insecticides of the type of pyrethrum. The novel compounds may also be sulfated to form excellent detergents. Also, the novel amides and imides, and particularly those having unsaturated acyl radicals, may be sulfurized to produce highly desirable substances which may be used as addition agents in lubricating oils and greases to reduce corrosive and/or abrasive wear, scuffing, etc.

We claim as our invention:

1. N-(3-sulfolanyl) acetamide of the formula:

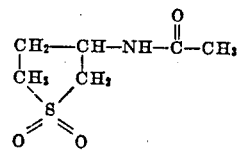

2. N-(3-sulfolanyl) oleylamide of the formula:

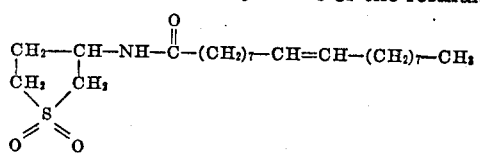

3. N-(3-sulfolanyl) 2-ethyl-hexoylamide of the formula:

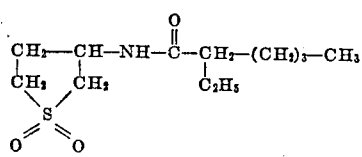

4. An N-(3-sulfolanyl) amide of an unsaturated fatty acid of the formula:

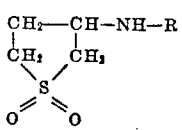

wherein R is the acyl radical of an unsaturated fatty acid.

5. An N-(3-sulfolanyl) amide of a saturated fatty acid of the formula:

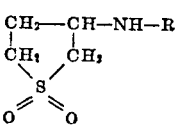

wherein R is the acyl radical of a saturated fatty acid.

6. An amide of a sulfolanylamine and a monocarboxylic acid, wherein the amide nitrogen atom is directly attached to the acyl radical of said acid and to a nuclear carbon atom in said sulfolanylamine at least once removed from the nuclear sulfur atom therein.

7. An amide of a sulfolanylamine and a carboxylic acid, wherein the amide nitrogen atom is directly attached to the acyl radical of said acid and to a nuclear carbon atom in said sulfolanylamine.

THEODORE W. EVANS.
RUPERT C. MORRIS.
EDWARD C. SHOKAL.

REFERENCES CITED

The following references are of record in the file of this patent:

UNITED STATES PATENTS

| Number | Name | Date |
| --- | --- | --- |
| 2,219,006 | Delfs | Oct. 22, 1940 |

OTHER REFERENCES

Chemical Abstracts, vol. 27, 2443 (1933).